Figure 8:
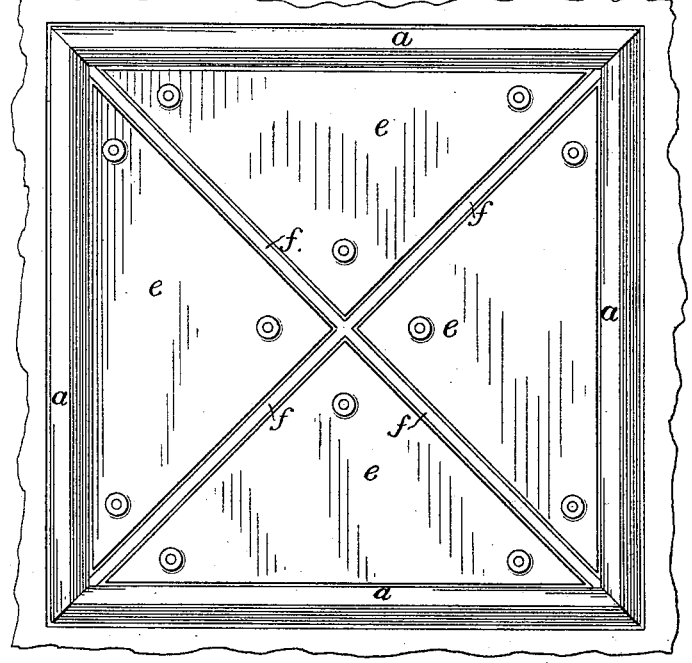

(No Model.) 2 Sheets—Sheet 1.
W. N. MILSTED.
METER DIAPHRAGM.
No. 482,185. Patented Sept. 6, 1892.
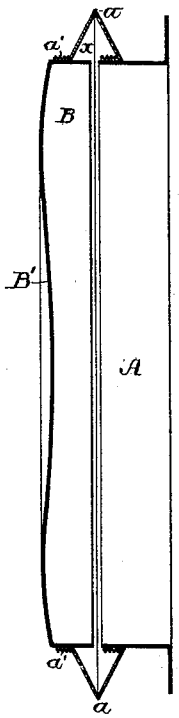
FIG.1.
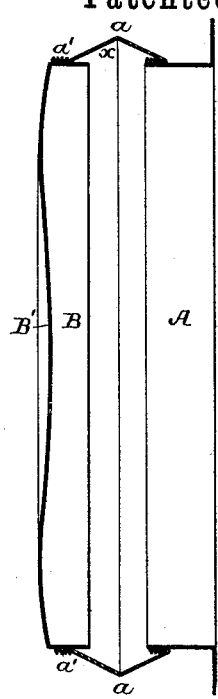
FIG.2.
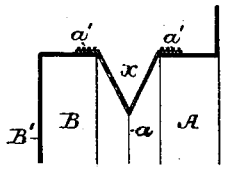
FIG.4.
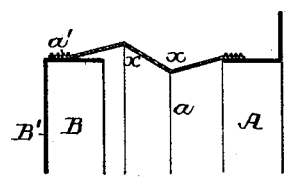
FIG.6.
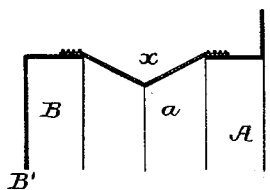
FIG.5.
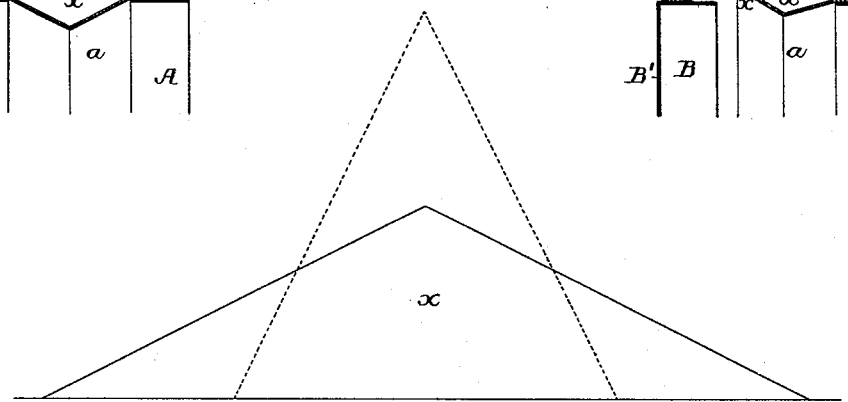
FIG.3.
FIG.7.
Witnesses:
Hamilton D. Turner.
Alex. Barkoff.
Inventor:
William N. Milsted
by his Attorneys
Howson & Howson (No Model.) 2 Sheets—Sheet 2.

W. N. MILSTED.
METER DIAPHRAGM.

No. 482,185. Patented Sept. 6, 1892.

Witnesses:
A. V. Groupe.
Murray LeBoyer

Inventor:
William N. Milsted
by his Attorneys
Howson & Howson

UNITED STATES PATENT OFFICE.

WILLIAM N. MILSTED, OF NEW YORK, N. Y.

METER-DIAPHRAGM.

SPECIFICATION forming part of Letters Patent No. 482,185, dated September 6, 1892.

Application filed July 24, 1891. Serial No. 400,539. (No model.)

*To all whom it may concern:*

Be it known that I, WILLIAM N. MILSTED, a citizen of the United States, and a resident of New York city, New York, have invented certain Improvements in Meter-Diaphragms, of which the following is a specification.

The object of my invention is to construct a meter which will measure the exact quantity of gas passed through it more accurately than meters which have heretofore been constructed; and this object I attain by so constructing the meter that the space beyond the line of the movable disks or plates and inclosed by the leather or other flexible material will be the same in area when the diaphragm is fully extended and when the diaphragm is fully contracted, so that the meter cannot register any more or any less gas than actually passes through it.

In the accompanying drawings, Figure 1 is a sectional view of sufficient of a meter-diaphragm to illustrate my invention, showing the diaphragm in the closed position. Fig. 2 is a similar view showing the diaphragm in the open position. Fig. 3 is a diagram illustrating the different positions assumed by the flexible material when the diaphragms are in the closed and opened positions. Figs. 4 and 5 are views similar to Figs. 1 and 2, but illustrating the flexible material in a different position. Figs. 6 and 7 are views showing a further modification of the arrangement of the flexible material; and Figs. 8 to 12, inclusive, are views which will be more specifically referred to hereinafter, illustrating my invention applied to a "Defries" or flat diaphragm.

Referring to Figs. 1 and 2, A and B are the two annular flanges of a meter-diaphragm, the flange A in the present instance being secured to the partition of the meter and the flange B, forming part of the head B'. The flexible connecting-piece $a$ unites the two flanges A B of the diaphragm, this connecting-piece being made of leather or other suitable material, which is formed or blocked in any suitable manner into the shape shown either in Figs. 1, 4, or 6, the preferred form being that shown in Fig. 1. The edges of the piece $a$ are secured to the flanges in any suitable manner, preferably by cord wrappings $a'$, as shown in the various figures. The space $x$ inclosed by this flexible portion $a$ is triangular in cross-section, and when the diaphragm is fully closed, as shown in Fig. 1, the base of the triangle is shorter than its altitude; but when the diaphragm is opened, as shown in Fig. 2, the base is lengthened and the altitude increased.

In the diagram Fig. 3 the full lines show the shape of the space $x$ when the diaphragm is fully extended, and the dotted lines show the shape of the space when the diaphragm is fully closed and the cubical area of both spaces is precisely the same. If the leather or other material from which the flexible portion $a$ is made shrinks or expands from any cause, the space $x$ will vary in area to a slight extent; but this variation in the area of the space will cause the diaphragm to so act as it is opened and closed that the meter will pass more gas than is registered, if the variation be perceptible, and not less gas, as often occurs in the present construction of meters.

The construction shown in Figs. 4 and 5 is precisely the same as that shown in Figs. 1 and 2, except that the position of the flexible material is reversed, while in Figs. 6 and 7 the construction is such that the triangular space is half within and half without the flange of the diaphragm.

In Fig. 8 I have shown what is termed a "Defries" or flat diaphragm made up of a series of triangular plates $e$ $e$, having flexible portions $ff$ between them and the flexible portions $a$ between the plates and the outer frame. This flexible portion $a$ may be made in the same manner as described with reference to Figs. 1 and 2 or may be shaped according to any of the modifications illustrated in the drawings.

Figure 9:
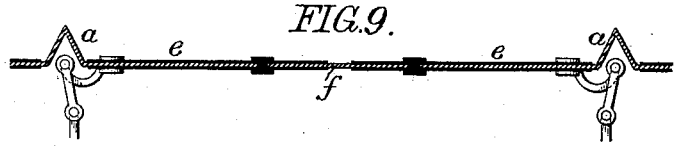
Figure 10:
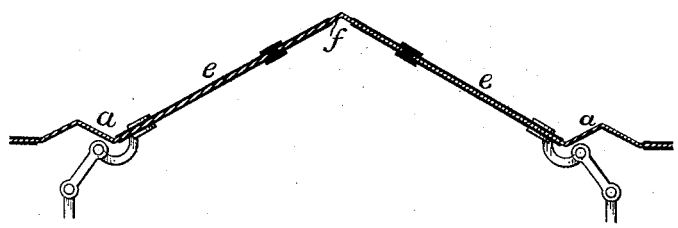

Fig. 9 shows a sectional plan view of the diaphragm contracted, and Fig. 10 a similar view showing the diaphragm expanded.

Figure 11:
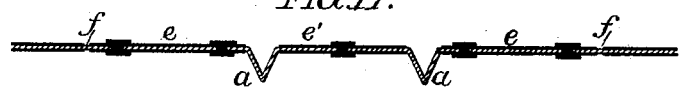
Figure 12:

Figs. 11 and 12 are views of a diaphragm of a type similar to that shown in Figs. 9 and 10, but provided with a central plate $e'$, and between this central plate and the plates $e$ I place the flexible portion $a$, the hinged portions $f$ in this instance being between the plates $e$ and the frame. By the use of a construction of this kind the flexible portion will at the measuring-points when the diaphragm is fully expanded and fully contracted contain precisely the same amount of gas and cannot register more gas than is actually passed, as is the case with many meters heretofore constructed.

It will be understood that my invention is applicable to all meters in which a flexible connecting-piece is used to form the joint between the diaphragm and the stationary portion of the meter.

Having thus described my invention, I claim and desire to secure by Letters Patent—

The combination of the fixed and movable portions of the diaphragm with the flexible portion inclosing the triangular space, the lines being so proportioned that the area of the space will be the same when the diaphragm is fully expanded and fully contracted, substantially as specified.

In testimony whereof I have signed my name to this specification in the presence of two subscribing witnesses.

WILLIAM N. MILSTED.

Witnesses:
 EUGENE ELTERICH,
 HARRY SMITH.